US008897579B2

(12) United States Patent
Chaudhury et al.

(10) Patent No.: US 8,897,579 B2
(45) Date of Patent: Nov. 25, 2014

(54) DIGITAL IMAGE ARCHIVING AND RETRIEVAL

(71) Applicant: Google Inc., Mountain View, CA (US)

(72) Inventors: Krishnendu Chaudhury, Bangalore (IN); Ashutosh Garg, Sunnyvale, CA (US); Prasenjit Phukan, Los Altos, CA (US); Arvind Saraf, Surat (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/049,772

(22) Filed: Oct. 9, 2013

(65) Prior Publication Data

US 2014/0044365 A1  Feb. 13, 2014

Related U.S. Application Data (63) Continuation of application No. 13/181,263, filed on Jul. 12, 2011, now Pat. No. 8,620,114, which is a continuation of application No. 11/564,823, filed on Nov. 29, 2006, now Pat. No. 7,986,843.

(51) Int. Cl.
  *G06K 9/72* (2006.01)
  *G06F 17/30* (2006.01)
  *G06K 9/68* (2006.01)
(52) U.S. Cl.
  CPC ........ *G06F 17/30253* (2013.01); *G06K 9/6857* (2013.01)
  USPC ............................ 382/229; 382/157; 382/182
(58) Field of Classification Search
  CPC ....................................................... G06K 9/72
  USPC .................................... 382/229; 282/157, 182
  See application file for complete search history.

(56) References Cited

U.S. PATENT DOCUMENTS

| 3,641,495 A | 2/1972 | Kiji |
| 3,872,433 A | 3/1975 | Holmes et al. |
| 4,949,392 A | 8/1990 | Barski et al. |
| 5,748,780 A | 5/1998 | Stolfo |
| 5,963,966 A | 10/1999 | Mitchell et al. |
| 6,002,798 A | 12/1999 | Palmer et al. |
| 6,323,876 B1 | 11/2001 | Rao et al. |
| 6,453,079 B1 | 9/2002 | McInerny |

(Continued)

FOREIGN PATENT DOCUMENTS

| CN | 1471036 A | 1/2004 |
| EP | 708412 A2 | 4/1996 |

(Continued)

OTHER PUBLICATIONS

About Xmail Hard Drive.com, Printed from Web on Aug. 10, 2006, http://www.xmailharddrive.com/beta/about.xmhd (2 pages).

(Continued)

*Primary Examiner* — Ruiping Li
(74) *Attorney, Agent, or Firm* — Fish & Richardson P.C.

(57) ABSTRACT

A computer-implemented method of managing information is disclosed. The method can include receiving a message from a mobile device configured to connect to a mobile device network (the message including a digital image taken by the mobile device and including information corresponding to words), determining the words from the digital image information using optical character recognition, indexing the digital image based on the words, and storing the digital image for later retrieval of the digital image based on one or more received search terms.

18 Claims, 4 Drawing Sheets

(56) References Cited

U.S. PATENT DOCUMENTS

| | | | |
|---|---|---|---|
| 6,704,120 B1 | 3/2004 | Leone et al. |
| 6,993,205 B1 | 1/2006 | Lorie et al. |
| 7,092,870 B1 | 8/2006 | Chen et al. |
| 7,466,875 B1 | 12/2008 | Siegel et al. |
| 2001/0020977 A1 | 9/2001 | Watanabe |
| 2001/0051998 A1 | 12/2001 | Henderson |
| 2002/0019833 A1 | 2/2002 | Hanamoto |
| 2002/0053020 A1 | 5/2002 | Teijido et al. |
| 2002/0064316 A1 | 5/2002 | Takaoka |
| 2002/0065955 A1 | 5/2002 | Gvily |
| 2002/0122607 A1 | 9/2002 | Sakai et al. |
| 2002/0135816 A1 | 9/2002 | Ohwa |
| 2002/0156834 A1 | 10/2002 | Kitada et al. |
| 2002/0186409 A1 | 12/2002 | Laverty et al. |
| 2003/0044068 A1 | 3/2003 | Kagehiro et al. |
| 2003/0110158 A1 | 6/2003 | Seals |
| 2003/0125929 A1 | 7/2003 | Bergstraesser et al. |
| 2003/0152277 A1 | 8/2003 | Hall et al. |
| 2003/0189603 A1 | 10/2003 | Goyal et al. |
| 2004/0004733 A1 | 1/2004 | Barker et al. |
| 2004/0019613 A1 | 1/2004 | Jones et al. |
| 2004/0024739 A1 | 2/2004 | Copperman et al. |
| 2004/0049737 A1 | 3/2004 | Simon et al. |
| 2004/0098664 A1 | 5/2004 | Adelman et al. |
| 2004/0119585 A1 | 6/2004 | Farley |
| 2004/0205448 A1 | 10/2004 | Grefenstette et al. |
| 2004/0252197 A1 | 12/2004 | Fraley et al. |
| 2005/0050141 A1 | 3/2005 | An et al. |
| 2005/0076295 A1 | 4/2005 | Simske et al. |
| 2005/0086205 A1 | 4/2005 | Franciosa et al. |
| 2005/0086224 A1 | 4/2005 | Franciosa et al. |
| 2005/0222985 A1 | 10/2005 | Buchheit et al. |
| 2005/0223058 A1 | 10/2005 | Buchheit et al. |
| 2005/0259866 A1 * | 11/2005 | Jacobs et al. ................. 382/157 |
| 2005/0289016 A1 | 12/2005 | Horstmann et al. |
| 2005/0289182 A1 | 12/2005 | Pandian et al. |
| 2006/0050996 A1 | 3/2006 | King et al. |
| 2006/0062472 A1 | 3/2006 | Engelberg et al. |
| 2006/0072822 A1 | 4/2006 | Hatzav et al. |
| 2006/0078207 A1 | 4/2006 | King et al. |
| 2006/0143154 A1 | 6/2006 | Jager |
| 2006/0206462 A1 | 9/2006 | Barber |
| 2008/0062472 A1 | 3/2008 | Garg et al. |
| 2008/0162602 A1 | 7/2008 | Garg et al. |
| 2008/0162603 A1 | 7/2008 | Garg et al. |

FOREIGN PATENT DOCUMENTS

| | | | |
|---|---|---|---|
| EP | 1091304 A2 | 4/2001 |
| EP | 1136938 A1 | 9/2001 |
| JP | 1084254 C | 2/1982 |
| JP | 2073598 A | 3/1990 |
| JP | 2183665 A | 7/1990 |
| JP | 4038840 U | 4/1992 |
| JP | 5189538 A | 7/1993 |
| JP | 5071349 B | 10/1993 |
| JP | 6195923 A | 7/1994 |
| JP | 6202081 A | 7/1994 |
| JP | 8123800 A | 5/1996 |
| JP | 05267249 B2 | 8/2013 |

OTHER PUBLICATIONS

Co-pending U.S. Appl. No. 11/617,537, Response filed Jan. 8, 2010, 24 pages, to be published by the USPTO.
Co-Pending U.S. Appl. No. 11/617,537, Response filed Jan. 8, 2009, 22 pages, to be published by the USPTO.
Co-Pending U.S. Appl. No. 11/617,537, Response filed May 25, 2010, 16 pages, to be published by the USPTO.
Co-Pending U.S. Appl. No. 11/847,055, Amended Response filed Sep. 13, 2010, 25 pages, to be published by the USPTO.
Co-Pending U.S. Appl. No. 11/847,055, Response filed Jun. 23, 2010, 25 pages, to be published by the USPTO.
DigiDocFlow.com Archiving Has Never Been Easier. Feb. 3, 2007. http://web.archive.org/web/20070203224853/http://www.digidocflow.com/en-US/Default.aspx?ContentType=3&Id=33.
Google Corporate Information: Google Milestones, Printed from Web on Aug. 14, 2006, http://www.google.com/corporate/history.html, Last Updated Jan. 2006 (14 pages).
Japanese Patent Office, English translation of Office Action mailed Jul. 17, 2012, JP Application No. 2009-539459, 8 pages.
International Search Report and Written Opinion dated Apr. 23, 2008 issued in corresponding PCT application No. PCT/US2007/088582, 10 pages.
Irani et al., "Improving Resolution by Image Registration," CVGIP: Graphical Models and image Processing, 53(3):231-239 (1991).
Kolak et al., "A Generative Probabilistic OCR Model for NLP Applications," Proceedings of HLT-NAACL 2003, Main Papers, 55-62 (Edmonton, May-Jun. 2003).
European Patent Office, EP Patent Application No. 07854811.2-2201, in Communication pursuant to Article 94(3) EPC, mailed Oct. 4, 2011, 7 pages.
European Patent Office, in European Patent Application No. 07854811.2, filed Nov. 28, 2007, Supplementary European Search Report, mailed Nov. 16, 2009, 7 pages.
Lee, B.W., Authorized Officer, Korean Intellectual Property Office, in PCT International Application No. PCT/US2007/085764, filed Nov. 28, 2007, Written Opinion, dated Mar. 14, 2008, 11 pages.
Microsoft.com Description of the Guest Account in Windows XP. Apr. 22, 2007. http://web.archive.org/web/20070422035827/http://support.microsoft.com/kb/300489.
U.S. Appl. No. 11/617,537, filed Dec. 28, 2006, in Office Action, mailed Mar. 30, 2010, 27 pages.
U.S. Appl. No. 11/617,537, filed Dec. 28, 2006, in Office Action, mailed Oct. 13, 2009, 27 pages.
U.S. Appl. No. 11/617,537, filed Dec. 28, 2006, in Office Action, mailed Apr. 30, 2009, 24 pages.
U.S. Appl. No. 11/617,537, filed Dec. 28, 2006, in Office Action, mailed Oct. 8, 2008, 21 pages.
U.S. Appl. No. 11/564,823, filed Nov. 29, 2006, in Office Action mailed Jan. 25, 2010, 14 pages.
U.S. Appl. No. 11/564,823, filed Nov. 29, 2006, in Office Action mailed Jun. 25, 2010, 16 pages.
Schmidt et al., "Using Mobile Phones for Domain Specific Information Alliances," Sep. 2005, Seventh International Conference on Ubiquitous Computing, Tokyo, Japan, 2 pages.
Sommermeyer, Katrin, Formalities Officer, European Patent Office, EP Patent Application No. 07854811.2-2201, in Communication pursuant to Article 94(3) EPC, mailed Nov. 8, 2010, 6 pages.
U.S. Appl. No. 11/847,055, filed Aug. 29, 2007, Office Action, mailed Mar. 23, 2010.
U.S. Appl. No. 11/847,055, filed Aug. 29, 2007, Office Action, mailed Aug. 9, 2012.
IP Australia, Australian Patent Application No. 2007325200, in Examination Report mailed Oct. 10, 2011, 2 pages.
Zhang, Huansheng, Authorized Officer, State Intellectual Property Office of the People's Republic of China, Chinese Patent Application No. 200780050269.9, in Office Action issued Jun. 20, 2011, 6 pages.
Office Action in Japanese Application No. 2009-539459, dated Nov. 13, 2012, 11 pages.
Office Action in Japanese Application No. 2013-046421, mailed Jan. 14, 2014, 14 pages.
Office Action in Korean Application No. 10-2009-7013412, mailed Feb. 25, 2014, 12 pages (English translation).

* cited by examiner

DIGITAL IMAGE ARCHIVING AND RETRIEVAL

CROSS REFERENCE TO RELATED APPLICATIONS

This application is a continuation application of U.S. patent application Ser. No. 13/181,263, filed Jul. 12, 2011, which is a continuation of U.S. patent application Ser. No. 11/564,823, filed Nov. 29, 2006 (now U.S. Pat. No. 7,986,843). The entire contents of each of the foregoing applications are incorporated herein by reference.

BACKGROUND

This specification discusses information organizing systems and methods, and more particularly features relating to automated archiving and retrieval of documents.

In everyday life, people frequently receive physical documents with information that may or may not be important, and may or may not be needed at a later time. For example, receipts and business cards are often received in the course of a day, and the recipient is often unsure whether, and for how long, to save such documents. Such documents can be saved physically or scanned for storage on a computer. In either event, the saved document is typically either dropped in some location without any archiving meta information (e.g., dropped in a drawer or a folder), or a person must deliberately associate archiving meta information with the document (e.g., by placing the document in a specific folder according to some docketing system, or by typing in information to associate with the document saved on a computer).

SUMMARY

This specification describes methods and systems relating to document archiving. These methods and systems allow a user to store and readily retrieve digital representations of physical documents. Digital images of physical documents can be processed using optical character recognition (OCR) techniques, then indexed and stored for later retrieval. Image acquisition, OCR processing and image archiving can be combined into an end-to-end system that can facilitate management of the myriad documents encountered in everyday life (e.g., receipts, business cards, doctor's prescriptions, tickets, contracts, etc.), and the user of this system need only take a picture to trigger the document archiving process in some implementations.

Users of the system can readily archive digital images of documents (with the same ease and informality of dropping a document in a drawer) and also readily retrieve the digital images using keyword searches. Digital cameras built into cell phones can be used to capture images, and OCR techniques can be used to recognize and extract relevant keywords from these images to allow effective searches later on. Acquired document images can be delivered directly from a mobile device to a back-end system (e.g., mobile gateway and email server). A user of the system need not download images from a mobile device to a personal computer in order to archive and store the images, thus making image archiving a simple process for the user. Moreover, lower resolution images can also be handled using enhanced OCR techniques, including various pre-processing and post-processing operations. Thus, the myriad documents encountered in everyday life can be readily digitized, organized, stored and retrieved quickly and efficiently.

In general, an aspect of the subject matter described in this specification can be embodied in a computer-implemented method that includes receiving a message from a mobile device configured to connect to a mobile device network, the mobile device including a digital camera, and the message including a digital image taken by the digital camera and including information corresponding to words; determining the words from the digital image information using optical character recognition; indexing the digital image based on the words; and storing the digital image for later retrieval of the digital image based on one or more received search terms. The method can further include receiving the one or more search terms; and retrieving the digital image based on the one or more search terms.

The method can include validating the mobile device (e.g., based on a mobile phone number and/or information associated with the received digital image). Receiving the message can include receiving an email message having the digital image attached; and the method can include adding at least one of the words, and a pre-defined label corresponding to the mobile device, to the email message; and the determining, indexing and storing can be performed in an electronic mail system.

Receiving the digital image can include receiving at least two digital images taken of a single object in response to a single input to the digital camera, and determining the words can include performing correlative optical character recognition on the at least two digital images to find the words. Determining the words can include performing the optical character recognition at multiple scales.

The method can include pre-processing the digital image to improve the optical character recognition. The pre-processing can include identifying a binarization threshold for the digital image by minimizing positional variance of left and right margins of a document represented in the digital image. The pre-processing can include obtaining a gray level at a higher resolution pixel by iteratively taking a weighted combination of gray levels of neighboring pixels at a lower resolution.

The method can include post-processing the words to identify and correct common character misidentifications resulting from the optical character recognition. Receiving the message can include receiving an indication of type for a document represented in the digital image, and the post-processing can include selecting between at least two dictionary based language models according to the indication of type for the document, and post-processing the words in accordance with the selected dictionary based language model. Moreover, receiving the indication of type can include receiving a user specified category in the message, the user specified category selected from a group including business cards and credit card receipts.

Other embodiments of this aspect include corresponding systems, apparatus, and one or more computer program products, i.e., one or more modules of computer program instructions encoded on a computer-readable medium for execution by, or to control the operation of, data processing apparatus.

An aspect of the subject matter described in this specification can be embodied in a system that includes a mobile device network; a plurality of mobile devices configured to take digital images, connect to the mobile device network, and transmit the digital images over the mobile device network; one or more computers configured to receive the digital images from the mobile devices, apply optical character recognition to extract words from the digital images, index the digital images based on the extracted words, and store the digital images for later retrieval based on received search terms. The one or more computers can include a first back-end component and a second back-end component, the first back-end component configured to receive the digital images, validate the mobile devices and apply the optical character recognition, and the second back-end component configured to index the digital images and store the digital images. The second back-end component can include an electronic mail system.

The mobile devices can include mobile phones, and the mobile device network can include a mobile phone network. The one or more computers can include a personal computer. The one or more computers can include a search appliance. The one or more computers can be configured to validate the mobile devices based on mobile phone numbers associated with the mobile devices.

The one or more computers can be configured to receive the search terms, and retrieve the digital images based on the search terms. The one or more computers can be configured to add extracted words and a pre-defined label to messages including the digital images. The one or more computers can be configured to perform correlative optical character recognition. The one or more computers can be configured to perform the optical character recognition at multiple scales.

The one or more computers can be configured to pre-process the digital images to improve the optical character recognition, and post-process the extracted words to identify and correct common character misidentifications resulting from the optical character recognition. The one or more computers can be configured to identify a binarization threshold for a digital image by minimizing positional variance of left and right margins of a document represented in the digital image. The one or more computers can be configured to obtain a gray level at a higher resolution pixel by iteratively taking a weighted combination of gray levels of neighboring pixels at a lower resolution.

The one or more computers can be configured to receive indications of document type along with the digital images, select between at least two dictionary based language models according to the indications of document type, and post-process the extracted words in accordance with the selected dictionary based language model. Moreover, an indication of document type can include a user specified category selected from a group including business cards and credit card receipts.

An aspect of the subject matter described in this specification can be embodied in a system that includes a mobile device network configured to transmit digital images; a server environment configured to provide electronic search service over a computer network; and means for connecting the mobile device network with the server environment, the means for connecting including means for applying optical character recognition to extract words from the digital images and means for providing the extracted words and the digital images to the server environment for electronic search service of the digital images via the computer network. The means for connecting can include means for validating mobile devices in the mobile device network. The means for providing can include means for adding extracted words and a pre-defined label to messages including the digital images.

The means for applying can include means for performing correlative optical character recognition. The means for applying can include means for performing the optical character recognition at multiple scales. The means for applying can include means for pre-processing the digital images to improve the optical character recognition, and means for post-processing the extracted words to identify and correct common character misidentifications resulting from the optical character recognition.

The means for applying can include means for identifying a binarization threshold for a digital image by minimizing positional variance of left and right margins of a document represented in the digital image. The means for applying can include means for obtaining a gray level at a higher resolution pixel by iteratively taking a weighted combination of gray levels of neighboring pixels at a lower resolution. The means for applying can include means for selecting between at least two dictionary based language models according to received indications of document type, and means for post-processing the extracted words in accordance with the selected dictionary based language model. Moreover, an indication of document type can include a user specified category selected from a group including business cards and credit card receipts.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
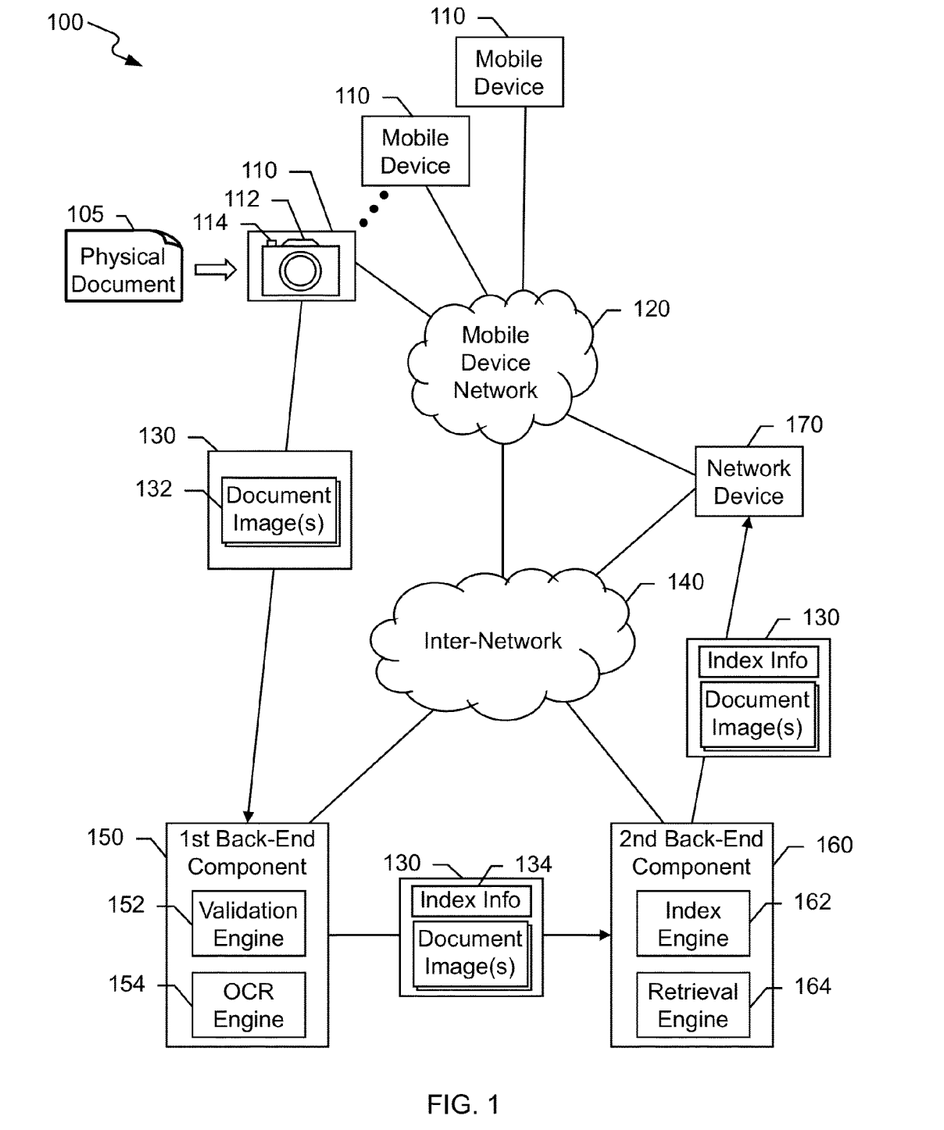
FIG. 1 is a schematic diagram of an example digital image archiving system.

FIG. 1 is a schematic diagram of an example digital image archiving system 100. The system 100 includes multiple mobile devices 110 (e.g., cell phones or personal digital assistants (PDAs)) that communicate through a mobile device network 120 (e.g., a private cell phone network or wireless email network). The devices 110 are mobile in the sense that they can communicate using wireless transmissions (short, medium, or long range). However, the mobile devices 110 can also include connectors for wired communications (e.g., a Universal Serial Bus (USB) connector).

The mobile devices 110 are configured to take digital images. Thus, a mobile device 110 includes a digital camera 112. The digital camera 112 can be built into a device having other functions (e.g., a mobile phone or PDA with built in camera), or the mobile device 110 can be the digital camera 112, which also has wireless communication capability.

The mobile device 110 can be used to take one or more digital images 132 of a physical document 105. The document 105 can be any physical document that includes one or more words. For example, the document 105 can be a business card, an ATM (Automatic Teller Machine) receipt, a credit card purchase receipt, a doctor's prescription, a ticket for travel (e.g., a plane ticket or railway ticket), a contract, a letter, a recipe seen in a magazine, etc. More generally, the document 105 need not be a paper document. The document 105 can be any physical article with words for which one might want an archived and retrievable digital image, e.g., a road sign, a posted public notice, a lost pet sign, a T-shirt, etc. Note that as used herein, the term "words" includes all manner of text information that can be identified using optical character recognition techniques, and multiple tokens can be grouped together and considered to be a single "word" by the system, irrespective of separating white space.

The digital image(s) 132 can be sent to a first back-end component 150 in a message 130. The message 130 can be a Multimedia Message Specification (MMS) message including the digital image(s) 132. Other message formats are also possible. For example, the message 130 can be an electronic mail message.

The first back-end component 150 can connect to the mobile device network 120 through another network 140, such as the Internet. Alternatively, the first back-end component 150 can connect directly to the mobile network 120 or be included within the mobile network 120. For example, the first back-end component 150 can be mobile gateway used to validate a cell phone 110 before the digital image(s) 132 are accepted for archiving.

The first back-end component 150 can include a validation engine 152 configured to validate the mobile devices 110, and an OCR engine 154 configured to apply optical character recognition to the digital image(s) 132. The first back-end component 150 can generate index information 134 to add to the message 130 (e.g., by adding the information to a subject line of an email message), thereby associating the index information 134 with the digital image(s) 132.

The index information 134 includes one or more words identified in the document image(s) 132 using the optical character recognition. The index information 134 can also include additional information, such as a pre-defined label, document type information, and system state information. The pre-defined label can correspond to the mobile device (e.g., the source mobile phone number), a function name associated with the image archiving feature of the mobile device (e.g., "PIC" for "Personal Image Container" can be the label used in the mobile device's user interface to identify the image archiving function), or both. The document type information can indicate the nature of the document (e.g., business card versus credit card receipt) and can be entered by a user (e.g., by selecting from a menu on the mobile device's user interface) or automatically determined (e.g., based on the relative vertical and horizontal dimensions of a document represented in the digital image(s) 132).

The system state information can include information such as the time and date (e.g., time stamp) of image acquisition, transmission, receipt, or a combination of them. Further system state information can also be included, such as the geographic location of the mobile device at the time of image acquisition, transmission, receipt, or a combination of them.

The first back-end component 150 can send the message 130, with included index information 134, to a second back-end component 160. The second back-end component 160 can connect to the mobile device network 120 through another network 140, such as the Internet. Alternatively, the second back-end component 160 can connect directly to the mobile network 120 or be included within the mobile network 120.

The second back-end component 160 can include an index engine 162 and a retrieval engine 164. The index engine 162 can archive the document image(s) 132 based on the index information 134. The retrieval engine 164 can fetch the document image(s) 132, for delivery to a network device 170, based on one or more search terms received from the network device 170. The network device 170 can connect to the mobile device network or the additional network 140. The network device 170 be a mobile device 110 or another machine. For example, the network device 170 can be a personal computer connected to the Internet and running a Web browser.

It is to be understood that the example system 100 shown in FIG. 1 can be implemented in multiple different ways, and the particular division of operational components shown is not limiting, but rather only presented as example. As used herein, the term "back-end component" includes both traditional back-end components (e.g., a data server) and middleware components (e.g., an application server). In general, the first and second back-end components 150 and 160 can be implemented using one or more servers in one or more locations, i.e., a server environment. For example, the first and second back-end components 150 and 160 can be server machines in a publicly accessible electronic mail system, such as the GMAIL™ system provided by Google Inc. of Mountain View, Calif.

Furthermore, it is to be understood that the message 130 can have its format modified between the various components of the system 100, and thus, may be considered separate messages at each stage. For example, the message received from the mobile device 110 can be in MMS format, the message received from the first back-end component 150 can be in a proprietary messaging format used between the first and second components 150 and 160, and finally the message received from the second back-end component 160 by the network device 170 can be in Hypertext Markup Language (HTML) format.

Regardless of the formats and component configurations used, the system 100 integrates the mobile devices 110, the mobile device network 120, and the back-end components 150 and 160 into one service for users of the mobile devices 110. Thus, for example, a user can take pictures with their cell phone and email the images (or send as MMS) to their email account, where the images are automatically OCR'd and indexed. The user can then access and search the images using the electronic mail system's user interface.

Figure 2:
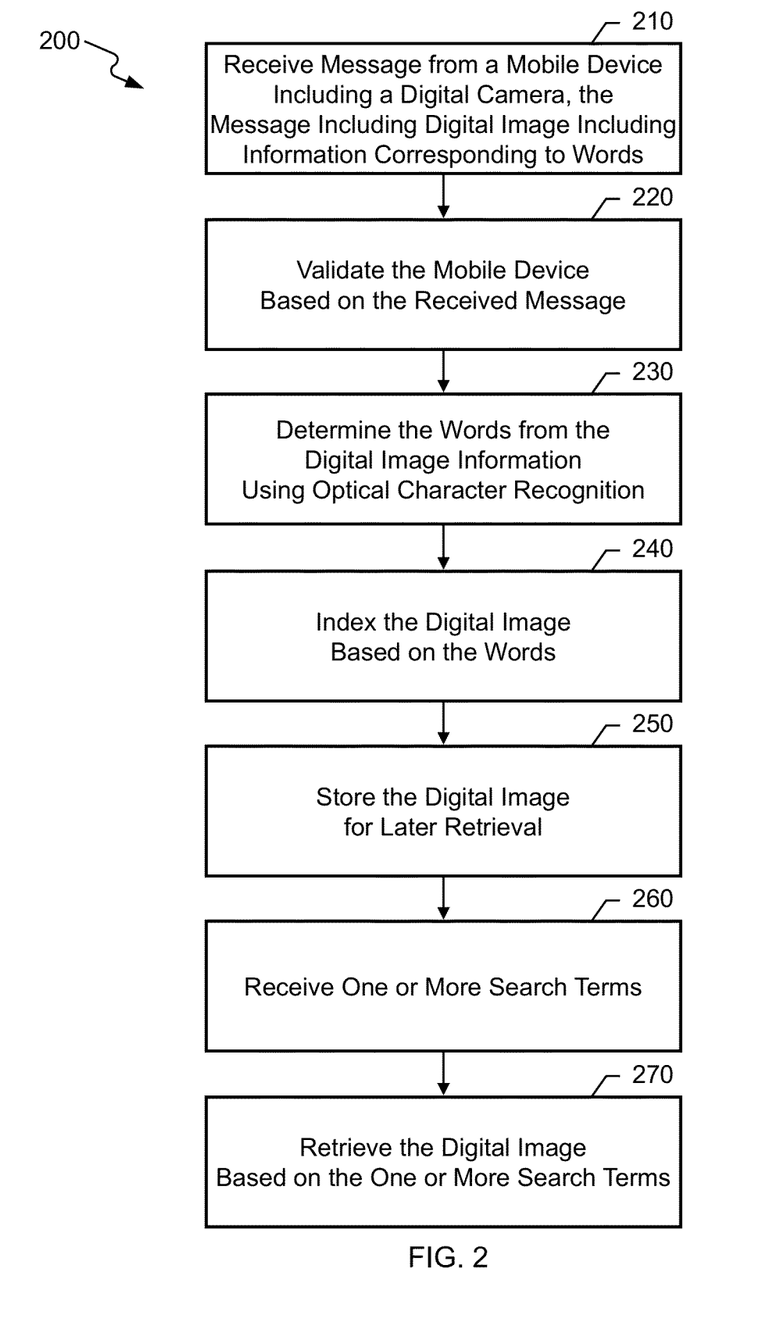
FIG. 2 is a flow chart of an example method of archiving and retrieving a digital image.

FIG. 2 is a flow chart of an example method 200 of archiving and retrieving a digital image. A message is received 210 from a mobile device having a digital camera. The mobile device can be a cell phone for which the user has registered the cell phone number with their account in an email system, and the message can be an email sent from a cell phone (e.g., to a known email address, such as archive@google.com) or an MMS sent to an email system shortcode (e.g., with a keyword indicating the archival service). The message from the mobile device includes one or more digital images taken by the digital camera, and the digital image(s) include information corresponding to words (i.e., image data that visually represents document text).

The mobile device can be validated 220 based on the received message. For example, a mobile gateway or the email system can validate the cell phone based on a previously employed authentication and association mechanism. A user account can be bound to a phone number, and the authentication and association mechanism can operate as follows. A user can initiate a binding by filling in a form at a Web site (e.g., the email system's Web site) specifying the user's mobile device number. An automated system can process the form and send an SMS (short message service) message to the user's mobile device for the Web request along with a randomly generated string. The user can then verify that string either on the Web or through an SMS sent back from the same mobile device. The user will know the string only if the mobile device belongs to the user. Alternatively, the user can initiate this binding from the mobile device instead, sending a message from it to an appropriate number or short code with an identifier associated with the user (e.g., as assigned by the Web site). The user's account receives a message with a string, to be verified similarly.

The words are determined 230 from the digital image information using optical character recognition. This can involve determining all the words in the image or extracting only relevant keywords. For example, very common words, such as "a" and "the" can be ignored, while words that occur less often in a dictionary can be ranked as more likely relevant. This can involve traditional techniques of simply stripping out stopwords (e.g. "and", "for", "a", "the", etc.) as used in Web search technology. This can also involve actively identifying some words as likely being more relevant, such as identifying proper nouns or named entities (e.g., "John", "San Diego", "Barnes & Noble", etc.), which likely signify a person, place, business, etc. In some implementations, all the words can be identified, and a processing engine at the back-end (e.g., the indexing engine) can handle the discrimination between relevant and non-relevant words.

In some implementations, the message can include at least two images of the same document, and the words can be determined by performing correlative optical character recognition on the at least two digital images to find the words. For example, two digital images can be taken separately by a user and manually grouped together for email or MMS transmission, or two digital images can be taken of a single object in response to a single input to the digital camera. For example, referring to FIG. 1, the digital camera 112 can have an input 114 that triggers two pictures to be taken in rapid succession and automatically sent to the first back-end component 150. Note that the input 114 can also be designed to trigger one picture and the automatic sending.

The input 114 can be a physical button on the mobile device 110 or a graphical element in a graphical user interface of the mobile device 110. The input 114 can be multifunctional, such as a side-mounted pressable thumbwheel. Alternatively, the input 114 can be dedicated to the image archive system, such that any picture displayed on the mobile device's screen can be automatically transmitted for OCR-ing and archiving in response to a single user interaction with the input 114. In any event, the input 114 can be configured to trigger sending of an image to the first back-end component 150 in response to one or two user input actions (e.g., one or two button pushes).

Referring again to FIG. 2, the determined words can be added to the subject line, header line or body of an email, and the full image(s) can be stored as an attachment to the email. In addition, the email can be automatically tagged with a pre-defined label (e.g., "PIC"). The digital image can be indexed 240 based on the words, and also possibly based on the pre-defined label. Various types of word indexing can be used. For example, the systems and techniques described in the following patent applications can be used: U.S. Patent Pub. No. 2005/0222985 A1, to Paul Buchheit et al., entitled "EMAIL CONVERSATION MANAGEMENT SYSTEM", filed Mar. 31, 2004 and published Oct. 6, 2005, and U.S. Patent Pub. No. 2005/0223058 A1, to Paul Buchheit et al., entitled "IDENTIFYING MESSAGES RELEVANT TO A SEARCH QUERY IN A CONVERSATION-BASED EMAIL SYSTEM", filed Aug. 6, 2004 and published Oct. 6, 2005, both of which are hereby incorporated by reference. The digital image is stored 250 for later retrieval of the digital image. Note that in some implementations, the indexing and storing operations are integrated with each other.

One or more search terms can be received 260 from a network device. These search term(s) can be entered by a user, such as in a Web browser interface (on a mobile phone, personal computer, etc.), and sent to the image archive system. Alternatively, these search term(s) can be generated by a computer in response to some input. In any event, the digital image can be retrieved 270 based on the one or more search terms, and presented to a user or sent to another system component for further processing.

In some implementations, the OCR techniques handle lower resolution images (e.g., images from one mega pixel cameras). In addition, steps can be taken to address issues raised by camera/lens quality, the distance from which the document is shot, and so on. Image enhancement and super-resolution techniques can be used to pre-process the document image for improved OCR-ability.

Figure 3:
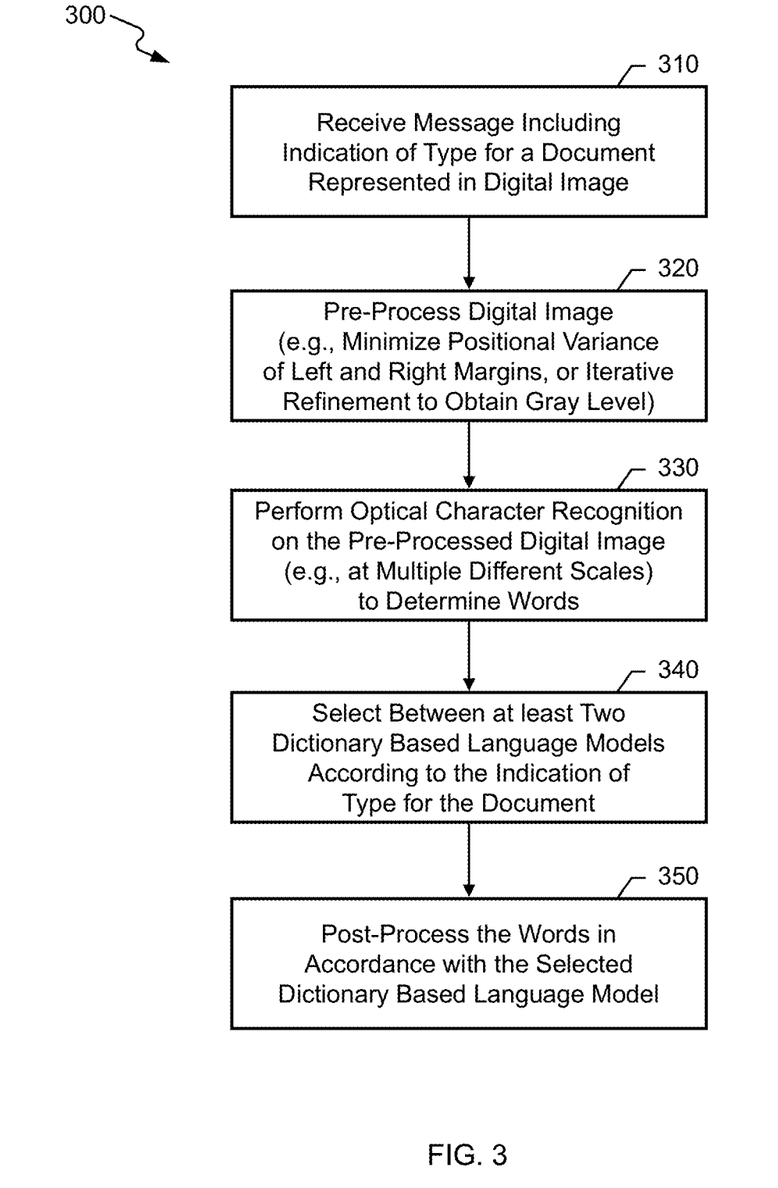
FIG. 3 is a flow chart of an example method of enhanced optical character recognition.

FIG. 3 is a flow chart of an example method 300 of enhanced optical character recognition. A message including a digital image can be received 310, and the message can include an indication of type for a document represented in the digital image. This indication of type can be explicitly included, such as when a user notes a type for the document (e.g., business card versus receipt) when the picture is taken. Alternatively, the indication of type can be an aspect of the image itself, such as the relative vertical and horizontal dimensions of a document represented in the digital image. For example, business cards typically have a common aspect ratio, which can be determined from a digital picture by checking for the edges of any paper document in the picture and their relation to the text on the document. The indication of type can also be determined by an initial OCR pass that finds some words, and then these words can be used to indicate the document type, which can affect later OCR processing.

The digital image can be pre-processed 320 to improve optical character recognition. The pre-processing can involve denoising and deskewing the image using traditional techniques. The pre-processing can involve identifying a binarization threshold for the digital image by minimizing positional variance of left and right margins of a document represented in the digital image. In addition, the pre-processing can employ an iterative refinement scheme that obtains the gray level at each high resolution pixel by iteratively taking a weighted combination of the gray levels of its neighboring pixels in the low resolution image.

Traditional super-resolution algorithms based on bicubic/bilinear/spline interpolation essentially run a low pass filter on the image, eliminating sharp edges. This results in further blurring of an image, which can be undesirable when the original image was already partially blurred. Blurring at letter boundaries can cause degradation of OCR quality. On the other hand, edge preserving super-resolution algorithms like nearest neighbor interpolation can cause aliasing artifacts that confuse the OCR engine. In contrast, the new approach described below can deblur, while super-sampling, without enhancing noise. Note that the words "super-sampling" and "super-resolution" are used synonymously herein.

Let $g(x, y)|(x, y) \in [1 \ldots M, 1 \ldots N]$, where M, N are image dimensions, represent an observed image. Let $f(x, y)|((x, y) \in R^2)$ be the underlying true image. In this model, g is a blurred version of f, i.e., $g = f * h^{PSF}$, where * denotes the convolution operator, and $h^{PSF}$ denotes the Point Spread Function (this function effectively models the blurring process). The $h^{PSF}$ need not be known explicitly since it is know that $h^{PSF}$ is generally a window function performing a weighted neighborhood smoothing. As such, the Point Spread Function can be modeled with a Gaussian function.

Considering $f^{(n)}$ as an approximation to f and $g^{(n)} = f^{(n)} * h^{PSF}$, the equations can be rewritten as, $$g = f * h^{PSF} \leftrightarrow G = (F \cdot H^{PSF})$$

$$g^{(n)} = f^{(n)} * h^{PSF} \leftrightarrow G^{(n)} = (F^{(n)} \cdot H^{PSF})$$

where upper-case letters denote Fourier Transforms. From the above equations, $$(G-G^{(n)})=(F-F^{(n)})\cdot H^{PSF} \text{ or}$$

$$(G-G^{(n)})\cdot(H^{BP})/c=(F-F^{(n)})$$

where c is a constant and $H^{BP}$ is a filter. Ideally, $1-(H^{BP})/c\cdot H^{PSF}=0$. However, since the Point Spread Function is a low pass filter, its Fourier Transform is usually zero at many frequencies, which complicates finding the function's inverse.

Hence, in practice, an iterative refinement scheme can be used: $F^{(n+1)}=F^{(n)}+(G-G^{(n)})\cdot(H^{BP})/c$, where $H^{BP}$ and c are chosen such that $1-(H^{BP})/c\cdot H^{PSF}>0$. Choosing c generally involves a tradeoff. Larger c implies more noise and error tolerance, but slower convergence and vice versa. The initial approximation of the underlying image, $f^{(0)}$, can be created via Bicubic B Spline interpolation. Thus, the iterative refinement scheme obtains the gray level at each high resolution pixel by iteratively taking a weighted combination of the gray levels of its neighboring pixels in the low resolution image.

Optical character recognition can be performed 330 on the per-processed digital image to determine words in the digital image. The OCR operation can be performed at multiple scales. Running the above super-resolution cum deblurring algorithm, multiple versions of the document can be created and OCR'd. For example, a first version at original scale, a second version at 2× scale, and a third version at 3× scale can be fed individually into the OCR engine and the union of the resulting words can be stored. The original document may have a mixture of font sizes—the smallest font may be too small for the OCR engine to recognize. These fonts can be recognized from the higher resolution (and deblurred) versions of the document. On the other hand, larger font sizes in the original document, may become too large, after super-resolution, for the OCR engine to recognize. These fonts can be recognized from the lower resolution versions.

In addition, irrespective of whether OCR is performed at multiple scales, often, the initial result of the optical character recognition will be strings of characters grouped together into words, which may or may not be real words (e.g., the word "clip" may be read as "c1ip", with the lowercase letter "l" replaced by the number "1"). Thus, post-processing can be performed on the words to identify and correct common character misidentifications resulting from the optical character recognition. The post-processing can be language model based and can use one or more dictionaries.

In some implementations, multiple dictionary based language models can be used. A selection can be made 340 between at least two dictionary based language models according to the indication of type for the document. Then, the words can be post-processed 350 in accordance with the selected dictionary based language model. In other implementations, a single dictionary based language model can be used for all images to be OCR'd (e.g., the dictionary can be a subset of words found on the Web).

The language based post-processing can improve the quality of OCR results obtained from the document image. The language based post-processing can be understood within the context of a probabilistic framework that connects character string outputs from the OCR, with words found in a dictionary. Note that the dictionary need not be a standard word dictionary, but can be any set of words derived from one or more corpora.

Let w denote word (a combination of space delimited letters). Let s denote an observed string outputted by the OCR process. Using Bayes rule, $$P(w|s)=P(s|w)P(w)/P(s)$$

Given an observed string s, the goal is to obtain $$w^*=\text{argmax}_w P(w|s)=\text{argmax}_w(P(s|w)P(w))$$

where P(w) indicates the probability of the word w occurring, P(w|s) indicates the probability of word being actually w when it is seen by OCR as s. Thus, a w that maximizes the a posteriori probability of a word given an observed OCR output string can be sought during post-processing. Furthermore, the post-processing can compute w* using two components: (1) A language model to estimate P(w) in the given text context; and (2) an OCR error model to estimate the probability of reading word w as s, P(s|w).

The language model gives the likelihood of a word w occurring in the given context. For example, the occurrences of each word in a corpus of training documents can be counted to build a dictionary of words and word probabilities. Such a dictionary based language model can be represented by a weighted finite state machine (WFSM) with the input labels as characters and accepting states corresponding to all dictionary words. Note that this example language model may not cover the proper nouns well.

Character based language models that estimate the probability of the next character given the string seen so far often do better with proper nouns. The representation can again be a WFSM, with the following cost measure:

$$C(s_i|c_1\ldots c_{i-1})=-\log P(s_i|c_1\ldots c_{i-1})$$

Instead of computing the above probabilities as conditional to the entire character sequence seen so far, only a few character history need be used. This allows coverage of a lot more words than there are in the training set. See, e.g., Kolak O., Resnik P., Byrne W., "A generative probabilistic OCR model for NLP applications", HLT-NAACL 2003. In addition, n-gram word based models can be used. These models use probability of occurrence of a word given the previous few words. Other language based models can also be used.

The error model computes the probability of the OCR engine reading an input character sequence w as s. This too can be estimated using a machine learning approach, and an error model can be created using training data, i.e., example images with input text and the OCR output. Both input and output text can be segmented into corresponding character segments w and s respectively. For example, this segmentation can be done using Levenshtein edit distance. The Levenshtein distance measures the distance between two strings as the minimum number of operations (insertion/deletion/substitution of single character) necessary to transform one string to another. With the segmented string pairs (s,w) in hand, a weighted finite state transducer (WFST) can be computed, with input labels corresponding to original characters and output labels being the OCR output characters. See, e.g., Kolak O., Resnik P., Byrne W., "A generative probabilistic OCR model for NLP applications", HLT-NAACL 2003. Alternatively, the edit distance approach can be used for computing the transition probabilities directly by measuring P(s|w) from counts above, and using the inverse as the transformation cost.

A corpus of documents with known ground truths can be used to estimate the cost/probability of letter substitution. The actual transformations (insertion/deletion/substitution of single characters) necessary to transform each observed OCR string to the known ground truth can be recorded. The number of occurrences of each transformation is a measure of the probability/cost of that particular transformation happening during the OCR process. Thus, there will likely be a large number of instances of the letter 'l' being mistaken as numeral '1', and hence assign a high probability to that occurrence.

Training data for computing the error model can be created by artificially generating images from text, adding noise to the generated images, and then generating OCR engine output from the images. For credit card receipts and business cards, local business listings data can be used to learn the dictionary/language model. Additionally, users of the system can be asked to submit document images of various types to serve as training data.

Figure 4:
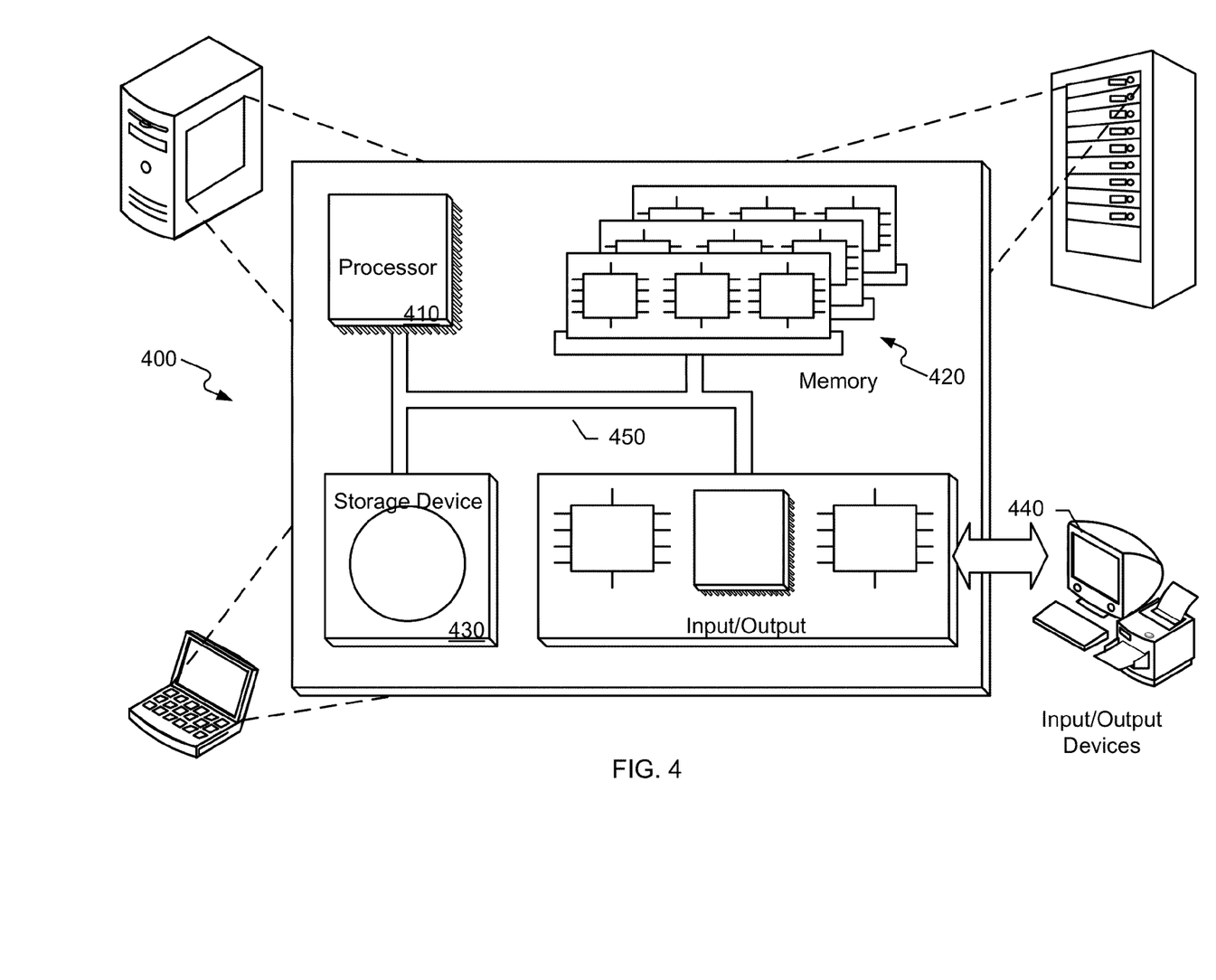
FIG. 4 is a schematic diagram of an example of a generic computer system.

FIG. 4 is a schematic diagram of an example of a generic computer system 400. The system 400 can be used for the operations described in association with the methods 200 and 300 according to some implementations. For example, the system 400 may be included in any or all of the mobile devices 110, the first and second back-end components 150 and 160, and the network device 170.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In some implementations, the processor 410 is a single-threaded processor. In other implementations, the processor 410 is a multi-threaded and/or multi-core processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 is a computer-readable medium. In various different implementations, the storage device 430 may be a floppy disk device, a hard disk device, an optical disk device, or a tape device.

The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on one or more computers and having a client-server relationship to each other.

Although a few implementations have been described in detail above, other modifications are possible. For example, any server environment configured to provide electronic search service and connect to a network (i.e., any networked search engine) can be integrated with a mobile device network using the systems and techniques described. The server environment can function as a network accessible hard drive. Moreover, the server environment need not be a traditional back-end or middleware component. The server environment can be a program installed on a personal computer and used for electronic search of local files, or the server environment can be a search appliance (e.g., Google™ in a Box, provided by Google Inc. of Mountain View, Calif.) installed in an enterprise network.

In addition, the logic flows depicted in the figures do not require the particular order shown, or sequential order, to achieve desirable results. Other operations may be provided, or operations may be eliminated, from the described flows, and other components may be added to, or removed from, the described systems. Accordingly, other implementations are within the scope of the following claims.

What is claimed is:

1. A system comprising:
one or more computers; and
a memory storage apparatus in data communication with the one or more computers, the memory storage apparatus storing instructions executable by the one or more computers and that upon such execution cause the one or more computers to perform operations comprising:
receiving a digital image that depicts a document that includes words;
performing a first optical character recognition operation on the digital image to extract, from the digital image, a portion of the words included in the document, the portion including fewer words than the document;
determining a document type of the document based on the portion of the words;
selecting between at least two dictionary based language models according to the document type of the document;
performing a second optical character recognition operation on the digital image to extract, from the digital image, the words included in the document;
processing the words extracted by the second optical character recognition operation in accordance with the selected dictionary based language model;
indexing the digital image based on the processed words; and
storing the digital image for later retrieval based on one or more received search terms.

2. The system of claim 1, wherein processing the words extracted by the second optical character recognition operation comprises determining a likelihood that a particular word of the words extracted by the second optical character recognition operation occurs in a textual context that includes the words extracted by the second optical character recognition operation using the selected dictionary based language model.

3. The system of claim 1, determining the document type further comprises determining the document type based on an aspect ratio of the document depicted in the digital image.

4. A system comprising:
one or more computers; and
a memory storage apparatus in data communication with the one or more computers, the memory storage apparatus storing instructions executable by the one or more computers and that upon such execution cause the one or more computers to perform operations comprising:
receiving a digital image;
selecting between at least two dictionary based language models according to an indication of a document type of the digital image, the indication indicating a type of document represented by the digital image;
applying optical character recognition to extract one or more words from the digital image, wherein applying optical character recognition to extract the one or more words from the digital image comprises:
applying optical character recognition to a first version of the digital image to extract a first set of words from the digital image, the first version of the digital image being at a first scale;
applying optical character recognition to a second version of the digital image to extract a second set of words from the digital image, the second version of the digital image being at a second scale that is different from the first scale; and
identifying, for extraction, the one or more words based on the first set of words and the second set of words;
processing the one or more words in accordance with the selected dictionary based language model;
indexing the digital image based on the processed one or more words; and
storing the digital image for later retrieval based on one or more received search terms.

5. The system of claim 4, wherein applying optical character recognition to extract the one or more words from the digital image comprises generating the second version of the digital image by obtaining a gray level for each pixel of the second version.

6. The system of claim 1, wherein at least one of the at least two dictionary based language models comprises a language model trained using business listings data.

7. A method performed by data processing apparatus, the method comprising:
receiving a digital image that depicts a document that includes words;
performing a first optical character recognition operation on the digital image to extract, from the digital image, a portion of the words included in the document, the portion including fewer words that the document;
determining a document type of the document based on the portion of the words;
selecting between at least two dictionary based language models according to the document type of the document;
performing a second optical character recognition operation on the digital image to extract, from the digital image, the words included in the document;
processing the words extracted by the second optical character recognition operation in accordance with the selected dictionary based language model;
indexing the digital image based on the processed words; and
storing the digital image for later retrieval based on one or more received search terms.

8. The method of claim 7, wherein processing the words extracted by the second optical character recognition operation comprises determining a likelihood that a particular word of the words extracted by the second optical character recognition operation occurs in a textual context that includes the words extracted by the second optical character recognition operation using the selected dictionary based language model.

9. The method of claim 7, wherein determining the document type of the document comprises determining the document type based on an aspect ratio of the document depicted in the digital image.

10. A method performed by data processing apparatus, the method comprising:
receiving a digital image;
selecting between at least two dictionary based language models according to an indication of a document type of the digital image, the indication indicating a type of document represented by the digital image;
applying optical character recognition to extract one or more words from the digital image, wherein applying optical character recognition to extract the one or more words from the digital image comprises:

applying optical character recognition to a first version of the digital image to extract a first set of words from the digital image, the first version of the digital image being at a first scale;

applying optical character recognition to a second version of the digital image to extract a second set of words from the digital image, the second version of the digital image being at a second scale that is different from the first scale; and identifying, for extraction, one or more words based on the first set of words and the second set of words;

processing the one or more words in accordance with the selected dictionary based language model;

indexing the digital image based on the processed one or more words; and storing the digital image for later retrieval based on one or more received search terms.

11. The method of claim 10, wherein applying optical character recognition to extract the one or more words from the digital image comprises generating the second version of the digital image by obtaining a gray level for each pixel of the second version.

12. The method of claim 7, wherein at least one of the at least two dictionary based language models comprises a language model trained using business listings data.

13. A non-transitory computer storage medium encoded with a computer program, the program comprising instructions that when executed by a data processing apparatus cause the data processing apparatus to perform operations comprising:

receiving a digital image that depicts a document that includes words;

performing a first optical character recognition operation on the digital image to extract, from the digital image, a portion of the words included in the document, the portion including fewer words than the document;

determining a document type of the document based on the portion of the words;

selecting between at least two dictionary based language models according to the document type of the document;

performing a second optical character recognition operation on the digital image to extract, from the digital image, the words included in the document;

processing the words extracted by the second optical character recognition operation in accordance with the selected dictionary based language model;

indexing the digital image based on the processed words; and storing the digital image for later retrieval based on one or more received search terms.

14. The non-transitory computer storage medium of claim 13, wherein processing the words by the second optical character recognition operation comprises determining a likelihood that a particular word of the words extracted by the second optical character recognition operation occurs in a textual context that includes the words extracted by the second optical character recognition operation using the selected dictionary based language model.

15. The non-transitory computer storage medium of claim 13, wherein determining the document type further comprises determining the document type based on an aspect ratio of the document depicted in the digital image.

16. A non-transitory computer storage medium encoded with a computer program, the program comprising instructions that when executed by a data processing apparatus cause the data processing apparatus to perform operations comprising:

receiving a digital image;

selecting between at least two dictionary based language models according to an indication of a document type of the digital image, the indication indicating a type of document represented by the digital image;

applying optical character recognition to extract one or more words from the digital image, wherein applying optical character recognition to extract the one or more words from the digital image comprises:

applying optical character recognition to a first version of the digital image to extract a first set of words from the digital image, the first version of the digital image being at a first scale;

applying optical character recognition to a second version of the digital image to extract a second set of words from the digital image, the second version of the digital image being at a second scale that is different from the first scale; and identifying, for extraction, one or more words based on the first set of words and the second set of words;

processing the one or more words in accordance with the selected dictionary based language model;

indexing the digital image based on the processed one or more words; and storing the digital image for later retrieval based on one or more received search terms.

17. The non-transitory computer storage medium of claim 16, wherein applying optical character recognition to extract the one or more words from the digital image comprises generating the second version of the digital image by obtaining a gray level for each pixel of the second version.

18. The non-transitory computer storage medium of claim 13, wherein at least one of the at least two dictionary based language models comprises a language model trained using business listings data.

* * * * *